United States Patent [19]

Ida et al.

[11] 3,948,709

[45] Apr. 6, 1976

[54] PROCESS AND APPARATUS FOR PRODUCING EXTRUSION-LAMINATED FILMS

[75] Inventors: Saburo Ida, Nagoya; Kuniharu Tobita, Ibaraki, both of Japan

[73] Assignee: Oji Yuka Goseishi Kabushiki Kaisha, Tokyo, Japan

[22] Filed: Aug. 27, 1973

[21] Appl. No.: 391,752

[30] Foreign Application Priority Data

Sept. 12, 1972  Japan............................... 47-91586

[52] U.S. Cl. ................ 156/209; 156/220; 156/222; 156/244; 156/500; 156/553; 156/582; 264/230; 264/320; 428/163; 428/172
[51] Int. Cl.² ......................................... B29C 15/00
[58] Field of Search ........... 156/196, 199, 209, 219, 156/220, 221, 229, 244, 290, 306, 309, 312, 324, 496, 498, 500, 553, 555, 582, 222, 223; 161/116, 118, 123; 264/230, 320; 428/156, 163, 172

[56] References Cited
UNITED STATES PATENTS 3,130,647   4/1964   Anderson et al. ..................... 93/35
3,241,429   3/1966   Rice et al. ................................. 88/1
3,350,492   10/1967  Grootenboer....................... 264/320
3,458,386   7/1969   Shanok et al. ...................... 161/121
3,481,804   12/1969  Snyder................................. 156/82
3,515,618   6/1970   Sidles.................................. 156/405
3,700,525   10/1972  Violette et al...................... 156/244

Primary Examiner—William A. Powell
Assistant Examiner—Brian J. Leitten
Attorney, Agent, or Firm—Wenderoth, Lind & Ponack

[57]     ABSTRACT

As a laminated film formed by continuously melt extruding an α-olefin polymer as a covering film on a traveling, continuous substrate film of an α-olefin polymer is being cooled by means of a cooling roll contacting the covering film side, pressing rolls are pressed against the laminated film on the substrate film side, along the lateral edge parts thereof, and toward the cooling roll thereby to cause local plastic deformation and thinning of the cover film, which has not fully solidified, due to elastic deflection without appreciably thinning the substrate film, and then the pressing rolls are retracted away from the laminated film, whereby thin-film regions for ensuring positive gripping by tentering clips for lateral stretching are formed along the lateral edge parts.

12 Claims, 7 Drawing Figures

PROCESS AND APPARATUS FOR PRODUCING EXTRUSION-LAMINATED FILMS

BACKGROUND

This invention relates generally to melt-extrusion lamination techniques for producing extrusion-laminated films. More specifically, the invention relates to the production of laminated films for lateral stretching or tentering by grasping the lateral edges thereof by means of clamping tools, that is, clips, and relates to a method and apparatus for producing laminated films which can be easily clamped by clips.

The method of melt extruding on one surface or both surfaces of a previously formed resin film (substrate film) a resin of the same kind or a different kind (i.e., different in properties such as chemical properties or melt index, etc.) and subjecting the films suitably to pressure and cooling thereby to produce a laminated film comprising the two films bonded together is known.

On one hand, the procedure of stretching a single-layer film or a laminated film of a resin at a temperature above the second-order transition temperature and below the melting point or the temperature at which the resin becomes fluid is also known.

In the case where a film of finite width and infinite length is continuously stretched in its longitudinal direction (i.e., the machine direction), a tension is applied to the film passing through a heating zone at points before and after this heating zone, but in the case where the film is stretched in the width direction, that is, in the transverse or lateral direction the film is passed through the heating zone as the lateral edges of the film are clamped by suitable tools and a tension force is applied thereto in the transverse direction.

While various kinds of clamping tools for gripping the lateral edges of a film to be stretched laterally are conceivable, one representative example thereof is a clip device as shown in FIG. 1, a plurality of which is used along each lateral edge of the film to stretch the film uniformly in the transverse direction. This clip device comprises, essentially, a C-shaped clip frame structure having a fixed jaw or anvil 1A and an upper head 1B disposed above and spaced apart from the anvil 1A, a horizontal pin 2 passing through the upper head 1B of the clip, and a lever 3 pivotally supported by the pin 2 and having a handle arm extending upward from the pin 2 and a clamp jaw arm extending slightly obliquely downward and terminating at a clamp jaw 3A.

The lateral edge 4 of a film entering the clip in the direction of the arrow X is clamped by and between the anvil 1A and the clamp jaw 3A. When the entire clip device 1 is moved in the arrow direction Y, the clamp jaw 3A at the lower end of the lever 3 is forced by a semi-toggle action against the upper surface of the anvil 1A, whereby the film lateral edge 4 is gripped strongly and a tension in the transverse direction is imparted thereto.

In the production of a film by melt extrusion of a resin, a so-called "neck-in" phenomenon occurs and gives rise to a reduction in the film width and an increase due thereto in the thickness of the film along its lateral edges or a so-called beaded edge effect.

These phenomena occur also in the case of melt-extrusion lamination. In the case where the base or substrate film has been produced by melt extrusion, this substrate film also has beaded edges as long as these lateral edges are not trimmed. Consequently, the lateral edge parts of melt-extrusion laminated films to be clamped by clips as described above become considerably thick.

On one hand, since the distance D and the length of lower clamp jaw arm of the lever 3 below the pin 2 are fixed in a clip of the above description, there are limits to the thickness of films which can be clamped by a given clip. More specifically, when the film thickness t becomes excessively large the angle $\theta$ becomes excessively large, whereby the gripping force between the anvil 1A and the jaw 3A does not become sufficiently large. On the other hand, a film which is thinner than the gap distance between the anvil 1A and the jaw 3A when the angle $\theta$ is zero cannot be gripped by this clip. While the jaw length from the pin 2 to the jaw 3A may be greater than the distance D, the tendency of the angle $\theta$ to become excessively large in this case is greater than that in the case where this jaw length is less the distance D.

In order to avoid a drop in the gripping performance of the clip occurring in this manner, the bead-edge effect of the film part gripped by the clip is suppressed as much as possible, and a clip having a great distance between the anvil 1A and the jaw 3A is selected to permit the clip to grip a thick film. Such measures have heretofore been known.

However, these measures are not fully satisfactory. That is, suppression of the bead-edge effect imparts some kind of change in the melt-extrusion lamination conditions, and, at the same time, a change appears also in the lateral stretching behavior. The latter measure entails a drop in the productive efficiency due to diversification of clips. It is conceivable to provide a bead on each lateral edge of the film for the purpose of providing a part which can be more easily caught by the jaw 3A, but when such a thick bead exists at the film lateral edges, the film cannot be made to contact uniformly the surface of a cooling roll in the case where the film is to be cooled. As a result, the cooling becomes uneven, whereby the stretching also becomes non-uniform, and tearing due to stretching and other difficulties is caused.

Moreover, even if these problems were to be solved, the film gripping action of this type of clip would not necessarily be positive, and difficulties due to insufficient gripping would tend to occur in a lateral stretching or tentering operation.

Accordingly, there is a great need for improvements in the art, particularly in lateral stretching with the use of clips of this type, such as expansion of the range film thickness (i.e., the lateral edge thickness) which can be accommodated without specially varying the conditions of melt-extrusion lamination and, moreover, fundamental improvement of the gripping capability of the clips.

SUMMARY OF THE INVENTION

It is an object of this invention to overcome the above described difficulties and to realize the above stated improvements. We have found that this object and other objects can be achieved by forming a thin part along each lateral edge of the film to be clamped.

According to this invention in one aspect thereof, briefly summarized, there is provided a process for producing laminated films for lateral stretching thereof by gripping its lateral edges by means of clamping tools, which process comprises melt extruding a covering resin film on a substrate resin film and cooling the two films thereby to produce a laminated film wherein the two films are bonded together, and which is characterized in that a pressing force is applied to the laminated film undergoing cooling, at a part thereof where the covering resin film can be plastically deformed more easily than the substrate resin film, at parts thereof to be clamped by the clamping tools, from the side of the substrate film and toward and against a hard surface thereby to cause the substrate film to deflect elastically and be depressed under the pressing force while retaining its original thickness, the covering film undergoing cooling thereby being squeezed and plastically reduced in thickness at its local part between the hard surface and the substrate film thus deflected, and then the pressing force is removed thereby to permit the substrate film to return from its deflected state substantially to its planar state prior to the application of the pressing force, whereby the covering film at its part thus reduced in thickness, continuing to retain its plastically reduced thickness and to retain its bonded state to the substrate film, follows the substrate film as it thus returns to its planar state, and a depressed region of thin film is thereby formed in the laminated film at a part thereof corresponding to the part of plastically reduced thickness of the covering film and can be advantageously utilized for positive gripping by the clamping tools.

According to this invention in another aspect thereof, there is provided apparatus for producing extrusion-laminated films having an extrusion device for melt extruding a covering resin film on a traveling substrate resin film thereby to form a lainated film and a cooling roll for contacting and cooling the laminated film on the covering film side thereof, characterized by a device for producing a laminated film to be laterally stretched by clamping tools gripping the lateral edge parts thereof, this device comprising pressing rolls for pressing the laminated film at its lateral edge parts, from the substrate resin film side thereof, and against the cooling roll.

The nature, principle, utility, and further features of this invention will be apparent from the following detailed description when read in conjunction with the accompanying drawings, in which like parts are designated by like reference numerals or characters.

DRAWINGS

In the drawings:

FIG. 1 is a diagrammatic elevation showing one example of a clip for lateral stretching of films;

FIGS. 2(A), 2(B), and 2(C) are fragmentary cross sectional views indicating progressive stages in the forming of a thin-film part in the covering film side of a laminated film by pressing the laminated film from its substrate film side;

DETAILED DESCRIPTION

Figure 1:
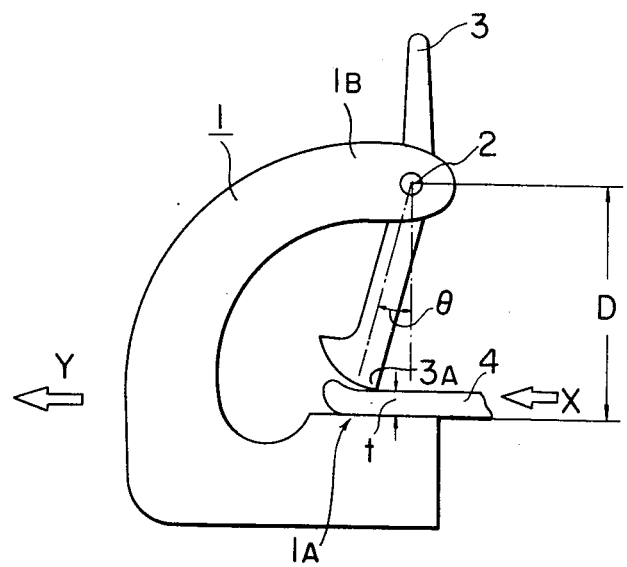

In accordance with this invention, a thin part is formed at each lateral edge part of a laminated film where the film is to be gripped by clamping tools as the melt-extrusion lamination per se is carried out by the ordinary process, and, moreover, the beaded edge effect is freely permitted to occur thereby to make possible the wide use of clips manufactured for clamping thin films. This thin part of the film edge is not necessarily a flat thin part and, depending on the shape of the pressing roll, may be a thin part having the shape of a Vee-shaped groove.

While this thin film part is formed on the covering resin film side, an important feature of this invention is that the forming of this thin film part in the covering resin film is carried out by pressing the laminated film during cooling thereof from its covering resin film side against a hard surface. For example, the lateral edge parts of the laminated film are pressed on and against a cooling roll by a disk-shaped roll.

In the formation of the thin film part according to this invention, the difference in the properties relative to plastic deformation of the substrate resin film and the covering resin film of the laminated film in the cooling process, that is, the fact that, in the laminated film undergoing cooling, the covering resin film in the molten state or the state immediately thereafter undergoes plastic deformation more easily, or its consistency is less, is advantageously utilized.

FIGS. 2(A), 2(B), and 2(C) are sectional views taken along a plane including the centerline axis of a cooling roll 5 and cutting the cooling roll and a laminated film 6, 7. When the laminated film in the course of cooling is pressed along its lateral edge part against the cooling roll 5 with a pressing roll 8 from the side of the substrate film 7, the substrate resin film at that edge part is deformed in bending and assumes a curved shape while retaining its thickness $t_2$, but the "soft" covering resin film 6, which has not yet fully solidified, acquires a thickness $t_1$ at that edge part which is less than its initial thickness, as indicated in FIG. 2(A).

When the pressing force due to the pressing roll 8 is removed, the substrate film 7 tends to return to its state prior to the application of the pressing force, still retaining its initial thickness $t_2$. On the other hand, the covering film 6, which is less "soft" because of advance of cooling but is substantially retaining its thickness $t_1$, closely follows the movement of the substrate film 7 since the two films 6 and 7 are bonded together, as indicated in FIG. 2(B). Upon completion of cooling, the substrate film 7 returns substantially to its original state, and the covering film 6 follows the substrate film. As an ultimate result, a thin film part 18 is formed on the side opposite from the pressing force application, that is, on the covering resin film side.

For forming a thin film part in the "soft" covering resin film, the direct application of a pressing roll to this film would appear to be a logical method. However, such a direct forming method gives rise to difficulties such as sticking of the covering resin to the pressing roll and overheating of the pressing roll, whereby stable operation over a long period cannot be achieved.

The method of the present invention, except for the pressing of the laminated film in the course of cooling along its lateral edge parts from its substrate film side thereby to form the thin film parts is essentially the same as an ordinary melt-extrusion lamination technique.

1. MELT-EXTRUSION LAMINATION

This process can be practiced through the use of an apparatus which normally operates continuously and comprises, basically, a device for melt extruding a covering resin film on a traveling base or substrate resin film and a device for cooling the laminated film thus formed. The cooling of the laminated film is ordinarily carried out by means of a cooling roll, the covering resin film side of the laminated film being placed in contact with this cooling roll.

The application of the bonding pressure between the substrate resin film and the covering resin film can be accomplished by utilizing the tension force produced in the laminated film on the cooling roll by the taking up of the film, but ordinarily, a roll made of an elastic material is used to press the laminated film against the cooling roll. The details of melt-extrusion lamination processes are known to those skilled in the art, but depending on the necessity, reference may be made to BRITISH PLASTICS, 1962, June, pp.296 to 301; MODERN PACKAGING Vol. 34, No. 5, 1961, January, pp. 107 to 111, 174 and 176; MODERN PLASTICS, 1963, June, pp. 95 to 98, 170, 173, 174, 178 and 179, which are incorporated herein by reference.

The term "substrate resin film" is herein used in the sense of a film to become a base or substrate material to which a molten resin film is bonded in a molten state and does not mean a film exhibiting behavior of a substrate material on some point within the formed laminated film. Accordingly, this may be a film of laminated structure in addition to a film of a single-layer structure. For example, in the case where a laminated film of three-ply construction is to be produced, a previously fabricated two-ply laminated film, as a whole, is considered for purposes of the present invention to be a "substrate layer film." The substrate resin film may be a film which has been stretched in the longitudinal direction or the lateral direction (particularly the longitudinal direction).

The term "covering resing film" is similarly considered and does not mean an ingredient of auxiliary nature relative to the substrate material.

While the resins constituting these films may be any which can withstand the melt-extrusion lamination process, those among such resins which have crystallinities such as to be beneficially affected by stretching are particularly preferable. Example of such resins are: polyolefins, particularly resinous or isotactic homopolymers respectively of α-olefins such as ethylene, propylene, and butene-1; resinous copolymers of these α-olefins, for example, a resinous copolymer of ethylene and propylene (the "resinous" state being realized when the ethylene content is more than 0.5 percent and less than 30 percent, both by weight relative to the copolymer); copolymers of the above enumerated α-olefins with other monomers copolymerizable therewith, for example, ethylene-vinyl acetate copolymer of, for example, up to 40 percent by weight of vinyl acetate content, ethylene-alkyl (C1 to C4) acrylate of, for example, up to 30 percent by weight of acrylate content, and ethylene-vinyl chloride copolymers of, for example, up to 30 percent by weight of vinyl chloride content; polymers of vinyl halides; polymers of styrenes; polymers of acrylic acid, methacrylic acid, and esters thereof; polyamides, and polyesters such as polyethylene terephthalate. These resins may contain fillers, antioxidants, flame retarders, plasticizers, coloring matter, and other auxiliary materials.

The extrusion lamination process per se is known and can be carried out by any of the known methods including that wherein a so-called "anchor coat," that is, a layer for improving adhesion, is provided between the substrate film and the covering film.

2. FORMING THE THIS FILM PARTS

As mentioned hereinbefore, a laminated film in the process of cooling is pressed against a hard surface from the substrate resin film side along a part of the laminated film to be gripped by clamping tools, whereby in the covering resin film on its side opposite from the substrate film, a thin film part is formed.

The application of the pressing force in this case may be carried out discontinuously or continuously along the lateral edge parts of the film. In the former case, the thin film parts are formed intermittently along the film lateral edge parts, while in the latter case, the thin film part is formed continuously, i.e., in the form of a groove or trough, along the film lateral edge parts.

While this application of the pressing force for forming the thin film parts can be carried by any suitable means, we have found that the most preferable means is a ring-shaped or disk-shaped roll.

Figure 2:
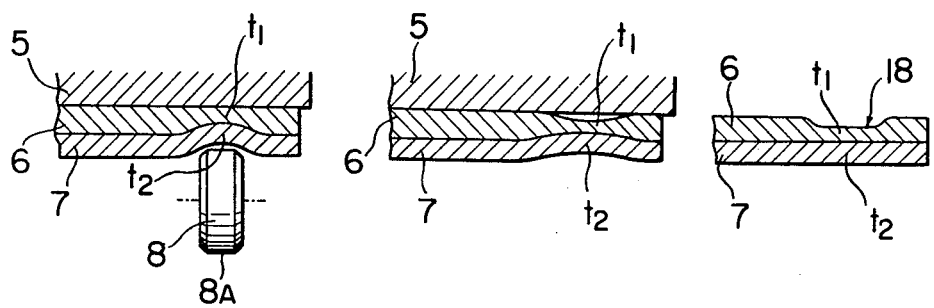
Figure 3:
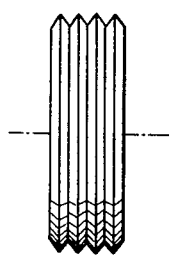
FIGS. 3 and 4 are views showing specific examples of pressing rollers for forming thin-film parts.
Figure 4:
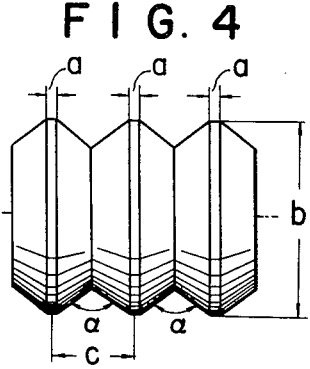

Specific examples of disk-shaped rolls are illustrated in FIGS. 2, 3, and 4, which are all views in directions perpendicular to the axis of rotations of these rolls. The roll 8 shown in FIG. 2(A) is a disk-shaped roll with beveled edges. That shown in FIG. 3 is substantially a cylindrical roll with a number of alternate sharp ridges and grooves of triangular cross section formed on the cylindrical surface thereof in the circumferential direction. The pressing roll shown in FIG. 4 also has alternate ridges and grooves similarly as in the roll shown in FIG. 3, but these ridges and grooves are larger relative to the roll diameter, and the sharp crests of the ridges have been chamfered off.

In addition, the peripheral surface 8A of the roll 8 shown in FIG. 2(A) can be made convex, that is, provided with a camber from flank to flank, or a disk-shaped roll can be formed in the shape of a gear, in which case, the resulting thin film parts become intermittent along the film lateral edges. The selection of a specific cross-sectional shape of a ring-shaped roll is determined by the cross-sectional shape of the jaw of the clip to be used and other factors. For example, in the case where the extreme end of the lever terminates with a clamp jaw 3A as in the clip illustrated in FIG. 1, the use of a disk-shaped roll as shown in FIGS. 3 and 4 may be considered to be appropriate in order to form thin film parts of Vee-groove shape, as described hereinafter. The disk-shaped roll shown in FIG. 3 or 4 may be said to be of a shape corresponding to a laminated structure of a plurality of unit disk-shaped rolls all of the same shape and dimensions, but in construction or in fabrication, this roll is not necessarily a laminated structure.

The cross-sectional profile of the thin film part formed on the covering resin film side substantially resembles the cross-sectional shape of the pressing roll. Consequently, a thin film part formed by a roll 8 as shown in FIG. 2 is flat, while a thin film part formed by a roll as shown in FIG. 3 or 4 has a ridge-and-valley profile. Accordingly, the term "thin film part" as herein used is intended to designate, in addition to a flat part having a continuous spread to some extent as in the thin film part 18 shown in FIG. 3(C), a thin film part comprising Vee-shaped grooves formed by a roll as shown in FIG. 3.

For the "hard surface" for receiving and countering from the covering film side the force of the pressing roll acting from the substrate film side, the only requirements are that it be "harder" than the covering resin at the time of application of the pressing force, and that it be a material to which the covering resin will not stick. In some cases this material may be an elastic material. While this hard surface may be an independent machine element for receiving and countering the pressing force, the utilization of the surface of a cooling roll, which is ordinarily made of a metal, is the most desirable. Accordingly, the preferable mode of embodiment of this invention is that wherein, with the laminated film in contact on its covering resin side with a cooling roll, a disk-shaped roll is pressed from the substrate film side against the laminated film and toward the cooling roll.

The point at which the pressing action starts should be downstream from the point of first contact between the substrate resin film and the molten covering resin film and, moreover, at a suitable place upstream from the point at which the difference between the "softness" of the covering resin film upon being cooled and that of the substrate film becomes substantially nonexistent. In the case where the pressing action starting point is too close to the point of contact of the two resin films, the fluidity of the molten covering resin film is excessively high. Consequently, unless the cooling rate is sufficiently high, i.e., unless the rate of decrease of the fluidity of the molten covering resin is sufficiently high, the thin film part which has once been formed, i.e., the part of the thickness $t_1$ in FIGS. 2(A) and 2(B), may be lost because of the fluidity of the covering resin. On the other hand, if the covering resin is over-cooled and has lost its "softness" to a considerable extent, forming of the thin film part will become difficult.

3. PRODUCTION APPARATUS

Figure 6:
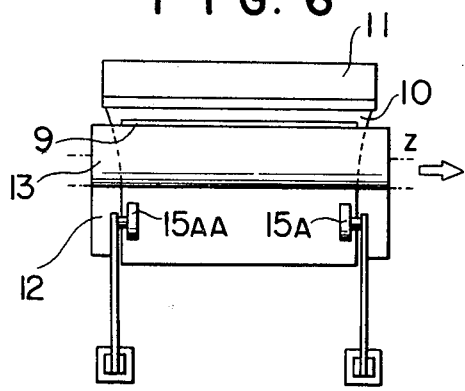
FIG. 6 is an elevation of the apparatus illustrated in FIG. 5 as viewed from the left.
Figure 5:
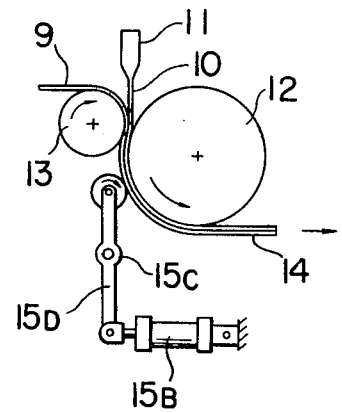
FIG. 5 is a diagrammatic side elevation showing one example of apparatus for producing laminated films in accordance with this invention.

One specific example of apparatus for producing laminated films with thin film parts according to this invention will now be described with reference to FIGS. 5 and 6. FIG. 5 is a side elevation as viewed in a direction perpendicular to the direction of advance of the film. FIG. 6 is an elevation of the apparatus shown in FIG. 5 as viewed from the left in FIG. 5.

A substrate film 9 is sent from a supply device as, for example, a supply roll (not shown), and on this substrate film 9, a covering resin film 10 is melt extruded and then contacts a cooling roll 12 to be cooled. An elastic roll 13, which is an idler roller, is used to press the resulting laminated film against the cooling roll 12, whereby a laminated film 14 of further improved uniformity and strength in the bond between the substrate resin film and the covering resin film is obtained.

At points in the path of the laminated film 14 downstream from the point of first contact between the substrate film and the molten covering film, which points correspond to those at which clips are to clamp the two lateral edge parts of the laminated film, a pair of disk-shaped pressing rolls 15A and 15AA are provided and impart pressing forces against the laminated film toward the cooling roll 12 from the substrate film side.

The pressing force for each pressing roll is produced by, for example, a mechanism comprising, essentially, an air cylinder 15B (pneumatic piston-cylinder actuator) and a lever 15D pivoted at an intermediate point 15C thereof and a pin connected at one end to the outer end of the piston of the air cylinder 15B, the lever 15D at its other end rotatably supporting a pressing roll 15A or 15AA. These pressing rolls 15A and 15AA are freely rotating or idler rolls, and the shapes of their outer peripheries are as shown in FIG. 2, 3, or 4.

It should be noted that the construction of the clamping tools (clips) per se does not constitute a part of this invention. The only requirement is that these clamping tools have sufficient gripping capability. Accordingly, each clamping tool has two "jaws," at least one of which is movable. We have found that, for the purpose of carrying out gripping and releasing of a lateral edge part of the film continuously and, moreover, automatically, a clamping tool of a structural arrangement including a "friction ratchet of the toggle type" as illustrated in FIG. 1 is the most suitable.

EXAMPLE

A polypropylene of a melt index (MI) of 3.0 was extruded and cast into a sheet, which was stretched 5 times in the machine direction (longitudinal direction), whereupon a substrate film of a thickness of 0.3 mm (the thickness at the two lateral edge parts being 0.6 mm) was obtained. This film was supplied to a laminating apparatus at a rate of 40 meters/minute (m/min), and on only one surface of this substrate film, polypropylene of a MI of 6.0 was extruded to form a laminated film of a thickness of 0.4 mm, a thickness at the edge beads of 0.8 mm, and a width of 250 mm.

The conditions of the laminating apparatus for this process were a cooling roll diameter of 258 mm, a cooling roll temperature of 60°C, an elastic roll diameter of 150 mm, and an elastic roll nip pressure of 8.5 kg/cm. At a position 120 mm downstream from the point of first contact between the film layers, a pair of disk-shaped pressing rolls, of the shape and dimensions set forth below, were caused to press with a force of 20 kg. the laminated film from the side of the substrate film against the cooling roll along the clip clamping parts of the film.

Disk-shaped pressing roll

Shape:   as shown in FIG. 4

$a =$   2 mm $b =$   70 mm $c =$   7.5 mm $\alpha =$   90°

As a result, it was found that, along each of the above mentioned clip clamping parts at the lateral edges of the laminated film thus press rolled, three grooves of a depth of 0.15 mm and lateral spacing of 7.5 mm due to the outer peripheral profile of the pressing roll had been formed by plastic deformation on the covering film side.

These clip clamping parts of this laminated film were clamped by means of a large number of tentering clips, and the film thus held was heated in air at a suitable temperature and laterally stretched 8 times at a speed of 40 m/min, whereupon it was found that there was no slippage at any of the clips and that the clamping action of all clips had been positive.

In contrast, when the above described procedure was carried without the application of the pressing rolls, it was found that at 144 clips out of a total of 1,200 clips, these were slippages of varying degree.

What we claim is:

1. In the production of a laminated film by melt extruding a covering resin film on a substrate resin film thereby to form a laminated film and cooling said laminated film, an improved process for producing a laminated film to be laterally stretched by clamping tools clamping the lateral edge parts thereof, which process comprises (1) applying a pressing force to the laminated film undergoing cooling, at a part thereof where said covering resin film can be plastically deformed more easily than the substrate resin film, at parts thereof to be clamped by said clamping tools, from the side of the substrate resin film, and toward and against a hard surface thereby to cause the substrate film to deflect elastically and concavely under said pressing force while retaining the original thickness thereof, the covering resin film undergoing cooling thereby being squeezed and plastically reduced in thickness at its part between said hard surface and the substrate resin film thus deflected, and (2) removing said pressing force from the laminated film thereby to permit the substrate resin film to return from its deflected state substantially to its undeformed planar state, whereby the covering resin film at said part thereof thus reduced in thickness, continuing to retain its reduced thickness and to retain its bonded state to the substrate resin film, follows the substrate resin film as it thus returns to its planar state, and a depressed region of thin film is thereby formed in the laminated film at a part thereof corresponding to said part of reduced thickness of the covering resin film and can be advantageously utilized for positive gripping by said clamping tools.

2. An improved process for producing a laminated film as set forth in claim 1 in which said pressing force is applied continuously by pressing a disk-shaped roll against the substrate resin film along each of its lateral edge parts, thereby to form continuously a thin film part along each of the lateral edge parts of the laminated film.

3. A process for producing a laminated film as set forth in claim 2 in which the principal surface of the disk-shaped roll for contacting the substrate resin film is parallel to the resin film.

4. A process for producing a laminated film as set forth in claim 2 in which the principal surface of the disk-shaped roll for contacting the substrate resin film has a shape with a crown in a section taken along a plane including the axial centerline of the roll.

5. A process for producing a laminated film as set forth in claim 2 in which the principal surface of the disk-shaped roll for contacting the substrate resin film has a peaked wedge-like shape in a section taken along a plane including the axial centerline of the roll.

6. A process for producing a laminated film as set forth in claim 2 in which the disk-shaped roll has a plurality of gear teeth thereon and forms thin film parts intermittently along the corresponding lateral edge part of the laminated film.

7. A process for producing a laminated film as set forth in claim 1 in which the cooling of the laminated film is accomplished by contacting a cooling roll in contact with the covering resin film, the surface of said cooling roll constituting said hard surface.

8. A process for producing a laminated film as set forth in claim 1 in which the substrate resin is a member selected from the group consisting of polyethylene, isotactic polypropylene, and resinous ethylene-propylene polymers.

9. A process for producing a laminated film as set forth in claim 1 in which the covering resin is a member selected from the group consisting of polyethylene, isotactic polypropylene, and resinous ethylene-propylene polymers.

10. An improved process for producing a laminated film as set forth in claim 1 in which said pressing force is applied continuously by pressing a roll against the substrate resin film along each of its lateral edge parts, the profile of the roll in a section taken along a plane including the axial center line of the row having a plurality of peaked portions separated from each other by recesses.

11. A process for producing a laminated film as set forth in claim 10 in which the peaked portions are all of the same shape and dimensions.

12. In the production of a laminated film by melt extruding a covering resin film of a first α-olefin polymer on a substrate resin film of a second α-olefin polymer thereby to form continuously a laminated film and cooling said laminated film, each of said first and second α-olefin polymers being selected from the group consisting of polyethylene, isotactic polypropylene, and resinous ethylene-propylene copolymers, an improved process for producing a laminated film to be laterally stretched by clamping tools clamping the lateral edge parts thereof, which process comprises (1) applying a pressing force to the laminated film undergoing cooling, at a part thereof where said covering resin film can be plastically deformed more easily than the substrate resin film, at parts thereof to be clamped by said clamping tools, from the side of the substrate resin film, and toward and against a hard surface by means of disk-shaped pressing rolls thereby to cause the substrate film to deflect elastically and concavely under said pressing force while retaining the original thickness thereof, the covering resin film undergoing cooling thereby being squeezed and reduced in thickness at its part between said hard surface and the substrate resin film thus deflected, and (2) removing said pressing force from the laminated film thereby to permit the substrate resin film to return from its deflected state substantially to its undeformed planar state whereby the covering resin film at said parts thereof thus reduced in thickness, continuing to retain its reduced thickness and to retain its bonded state to the substrate resin film, follows the substrate resin film as it thus returns to its planar state, and depressed regions of thin film are thereby formed in the laminated film continuously along said lateral edge parts thereof corresponding to said part of reduced thickness of the covering resin film and can be advantageously utilized for positive gripping by said clamping tools.

* * * * *